United States Patent
Li et al.

(10) Patent No.: US 11,889,500 B2
(45) Date of Patent: Jan. 30, 2024

(54) METHOD AND DEVICE FOR OBTAINING SCHEDULED THROUGHPUT, BASE STATION, AND STORAGE MEDIUM

(71) Applicant: ZTE Corporation, Shenzhen (CN)

(72) Inventors: Mingliang Li, Shenzhen (CN); Rihui Li, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 528 days.

(21) Appl. No.: 17/267,300

(22) PCT Filed: Aug. 12, 2019

(86) PCT No.: PCT/CN2019/100153
§ 371 (c)(1),
(2) Date: Feb. 9, 2021

(87) PCT Pub. No.: WO2020/030170
PCT Pub. Date: Feb. 13, 2020

(65) Prior Publication Data
US 2023/0292315 A1    Sep. 14, 2023

(30) Foreign Application Priority Data
Aug. 10, 2018    (CN) .......................... 201810912157.X

(51) Int. Cl.
*H04W 72/1273* (2023.01)
*H04W 28/02* (2009.01)

(52) U.S. Cl.
CPC ... *H04W 72/1273* (2013.01); *H04W 28/0278* (2013.01)

(58) Field of Classification Search
None
See application file for complete search history.

(56) References Cited

U.S. PATENT DOCUMENTS

| 2017/0202000 A1 | 7/2017 | Fu et al. |
| 2017/0237643 A1* | 8/2017 | Yi ................... H04W 28/0278 370/253 |
| 2018/0139636 A1 | 5/2018 | Kollar et al. |

FOREIGN PATENT DOCUMENTS

| CN | 103596212 A | 2/2014 |
| CN | 104507172 A | 4/2015 |

(Continued)

OTHER PUBLICATIONS

The State Intellectual Property Office of People's Republic of China. First Office Action for CN Application No. 201810912157.X and English translation, dated Jan. 17, 2022, pp. 1-13.

(Continued)

*Primary Examiner* — Walter J Divito
(74) *Attorney, Agent, or Firm* — Vivacqua Crane, PLLC

(57) ABSTRACT

A method and device for acquiring a scheduled throughput, a base station, a non-transitory computer-readable storage medium, and an electronic device are disclosed. The method comprises: buffering a user service request message received; allocating a downlink data scheduling resource according to a data size of the user service request message, wherein in response to a size of the allocated downlink data scheduling resource being greater than or equal to the data size of the user service request message buffered, a scheduling type of the current scheduling is determined as non-full scheduling, and in response to the size of the allocated downlink data scheduling resource being less than the data size of the buffered user service request message, the scheduling type of the current scheduling is determined as full scheduling; and acquiring a scheduled throughput according to a downlink data scheduling resource allocation result and the scheduling type.

21 Claims, 9 Drawing Sheets

(56) References Cited

FOREIGN PATENT DOCUMENTS

| CN | 105282780 A | 1/2016 |
|---|---|---|
| CN | 105453681 A | 3/2016 |
| CN | 106455089 A | 2/2017 |
| CN | 107302802 A | 10/2017 |
| WO | 2014014260 A1 | 1/2014 |

OTHER PUBLICATIONS

The State Intellectual Property Office of People's Republic of China. First Search Report for CN Application No. 201810912157.X and English translation, dated Dec. 24, 2021, pp. 1-4.
3GPP, "Scheduled IP Throughput for inter eNB CA," 3GPP TS 36.314 V15.1.0, May 21, 2018, pp. 1-4.
European Patent Office. Extended European Search Report for EP Application No. 19846987.6, dated Apr. 4, 2022, pp. 1-5.
International Search Report and Written Opinion for the International Patent Application No. PCT/CN2019/100153 Filed Aug. 12, 2019.
3GPP, "Layer 2—Measurements," 3GPP TS 36.314 V15.1.0, Jul. 9, 2018.
Ericsson, "pCR 28.554 Add KPI and UC related to UE throughput in RAN," 3GPP TSG SA WG5 (Telecom Management) Meeting #119Ad-Hoc S5-184340 Jun. 28, 2018.

* cited by examiner

METHOD AND DEVICE FOR OBTAINING SCHEDULED THROUGHPUT, BASE STATION, AND STORAGE MEDIUM

CROSS-REFERENCE TO RELATED APPLICATION

This application is a national stage filing under 35 U.S.C. § 371 of international application number PCT/CN2019/100153, filed Aug. 12, 2019, which claims priority to Chinese patent application No. 201810912157.X, filed Aug. 10, 2018. The contents of these applications are incorporated herein by reference in their entirety.

TECHNICAL FIELD

The present disclosure relates to the communication field of Long-Term Evolution (LTE) and New Radio (NR) technologies, and in particular to a method and device for acquiring a scheduled throughput, a base station, a non-transitory computer-readable storage medium, and an electronic device.

BACKGROUND

Scheduled Internet Protocol Throughput (also called Scheduled IP Throughput) is defined as an index reflecting a user perceived rate of LTE by making statistics on average peak throughputs of an LTE user. This index can reflect the congestion of an LTE wireless network and a fifth-generation (5G) NR by measuring the load, coverage, interference, and other conditions of the wireless network, and comprehensively reflect the scheduling of user's messages.

The Scheduled IP Throughput in design relies on a status change of a buffer (empty or not) to determine a tail packet (that is, a data packet in a non-full scheduling status), for the purpose of removing the tail packet. A protocol regards the data packet is in the non-full scheduling status when the buffer is empty, and regards the data packet is in a full scheduling status when the buffer is not empty. However, in a practical application process, although this statistical method of the protocol can reflect a radio air interface performance in a centralized packet-incoming (high-traffic service) scenario, it has certain limitations in a discrete packet-incoming (intermittent service) scenario, where incoming packets for an upper-layer service are relatively discrete and thus the volume of data in the buffer cannot always be greater than the radio air interface capability. The packets arrive at the buffer continuously while a scheduler is allocating scheduling resources, and thus the buffer has never been empty. However, the scheduler does not allocate all scheduling resources during each scheduling. According to the statistical methods of existing technologies, the data volume and time of these schedulings will be included in the statistics for the Scheduled IP Throughput index, resulting in that the statistically calculated index cannot truly reflect the wireless air interface performance.

In existing technologies, regarding the problem of the distortion of the scheduling throughput index caused by excessive statistics of small packets in the discrete business scenario, there is currently no reasonable solution.

SUMMARY

According to embodiments of the present disclosure a method and device for acquiring a scheduled throughput, a base station, a non-transitory computer-readable storage medium, and an electronic device are provided, to at least partially solve the problem of the distortion of scheduled throughput indexes caused by excessive statistics of small packets in a discrete business scenario in existing technologies.

According to an embodiment of the present disclosure, a method for acquiring a scheduled throughput is provided. The method includes: buffering a user service request message received; allocating a downlink data scheduling resource according to a data size of the user service request message, where a scheduling type of the current scheduling is determined as non-full scheduling in response to the size of the allocated downlink data scheduling resource being greater than or equal to the data size of the buffered user service request message, and the scheduling type of the current scheduling is determined as full scheduling in response to the size of the allocated downlink data scheduling resource being less than the data size of the buffered user service request message; and acquiring a scheduled throughput according to a downlink data scheduling resource allocation result and the scheduling type.

According to another embodiment of the present disclosure, a device for acquiring a scheduled throughput is provided. The device includes: a buffering module, configured to buffer a user service request message received; an allocation module, configured to allocate a downlink data scheduling resource according to a data size of the user service request message, where a scheduling type of the current scheduling is determined as non-full scheduling in response to the size of the allocated downlink data scheduling resource being greater than or equal to the data size of the buffered user service request message, and the scheduling type of the current scheduling is determined as full scheduling in response to the size of the allocated downlink data scheduling resource being less than the data size of the buffered user service request message; and an acquisition module, configured to acquire a scheduled throughput according to a downlink data scheduling resource allocation result and the scheduling type.

According to yet another embodiment of the present disclosure, a base station is provided. The base station includes: a Radio Link Control (RLC) protocol entity, configured to buffer a user service request message received; a scheduler, configured to allocate a downlink data scheduling resource according to a data size of the buffered user service request message, where a scheduling type of the current scheduling is determined as non-full scheduling in response to the size of the allocated downlink data scheduling resource being greater than or equal to the data size of the buffered user service request message, and the scheduling type of the current scheduling is determined as full scheduling in response to the size of the allocated downlink data scheduling resource being less than the data size of the buffered user service request message; and a Media Access Control (MAC) protocol entity, configured to acquire a scheduled throughput according to a downlink data scheduling resource allocation result and the scheduling type, According to yet another embodiment of the present disclosure, provided is a non-transitory computer-readable storage medium storing computer programs which, when executed, perform the method according to any of the above embodiments.

According to still another embodiment of the present disclosure, an electronic device is provided. The electronic device includes a memory, a processor and computer programs stored in the memory and executable by the processor, wherein the computer programs, when executed by the processor, cause the processor to perform the method of any one of the above embodiments.

According to the embodiments of the present disclosure, a new method for defining full scheduling and non-full scheduling is designed to solve the problem of excessive statistics of small packets in a discrete business scenario. According to the method, the received user service request message is buffered, and the downlink data scheduling resource is allocated according to a data size of the user service request message, where a scheduling type of the current scheduling is determined as non-full scheduling in response to the size of the allocated scheduling resource being greater than or equal to the data size of the buffered user service request message, and the scheduling type of the current scheduling is determined as full scheduling in response to the size of the allocated scheduling resource being less than the data size of the buffered user service request message; and the scheduled throughput is acquired according to the downlink data scheduling resource allocation result and the scheduling type. The method solves the problem that the scheduled throughput index is distorted due to excessive statistics of small packets in the discrete service scenario in existing technologies, effectively removes the tail packet, and improves the calculation precision of the scheduled throughput.

BRIEF DESCRIPTION OF DRAWINGS

The accompanying drawings described herein are intended to provide a deeper understanding of the present disclosure and constitute a part of the present disclosure. The exemplary embodiments of the present disclosure and the descriptions thereof are intended to explain the present disclosure, and do not constitute an undue limitation to the present disclosure. In the drawings.

DETAILED DESCRIPTION

The present disclosure will be described in detail below with reference to the accompanying drawings and in connection with embodiments. It should be noted that the embodiments of the present disclosure and features in the embodiments may be combined to derive other embodiments not explicitly described It should be noted that the terms "first", "second" and the like in the specification and claims of the present disclosure and the above-mentioned drawings are used to distinguish similar objects without having to be used to describe a particular order or sequence.

Scheduled IP Throughput is defined as an index reflecting a user perceived rate of LTE by making statistics on average peak throughputs of an LTE user. This index can reflect the congestion of an LTE wireless network and a fifth-generation (5G) NR by measuring the load, coverage, interference, and other conditions of the wireless network, and comprehensively reflect the scheduling of user's messages. All performance problems associated with an LTE radio air interface can be reflected by this index. The index has become a key monitoring index for wireless operators and equipment manufacturers, which is mainly used for various purposes including wireless network performance monitoring, wireless network expansion and the like, and widely applied in the fields of wireless network optimization, wireless user perception enhancement and the like.

Figure 1:
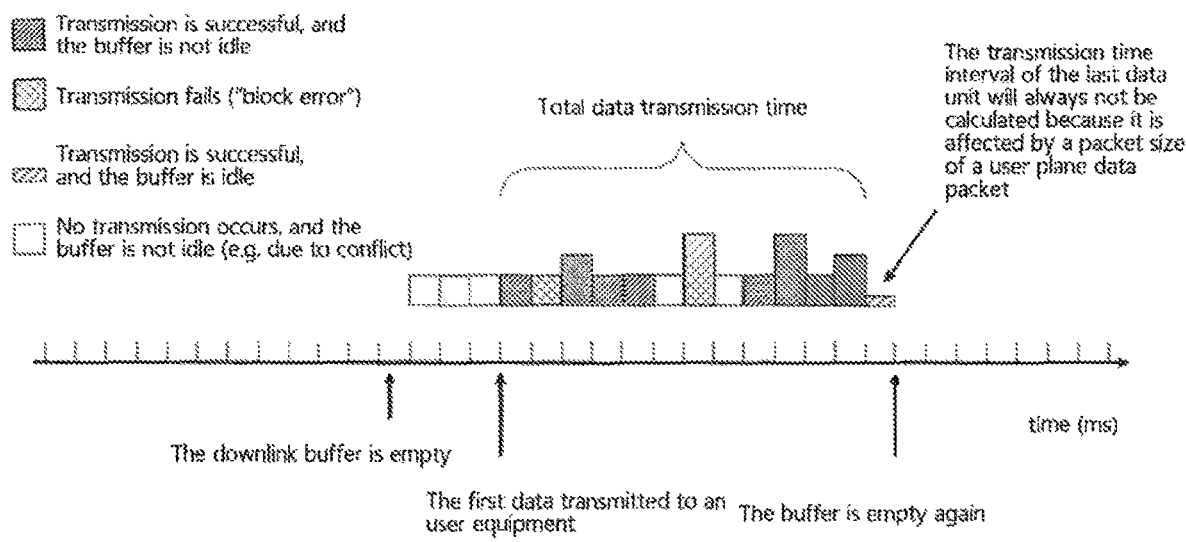
FIG. 1 is a schematic diagram of a Scheduled IP Throughput statistical method according to existing technologies.
Figure 2:
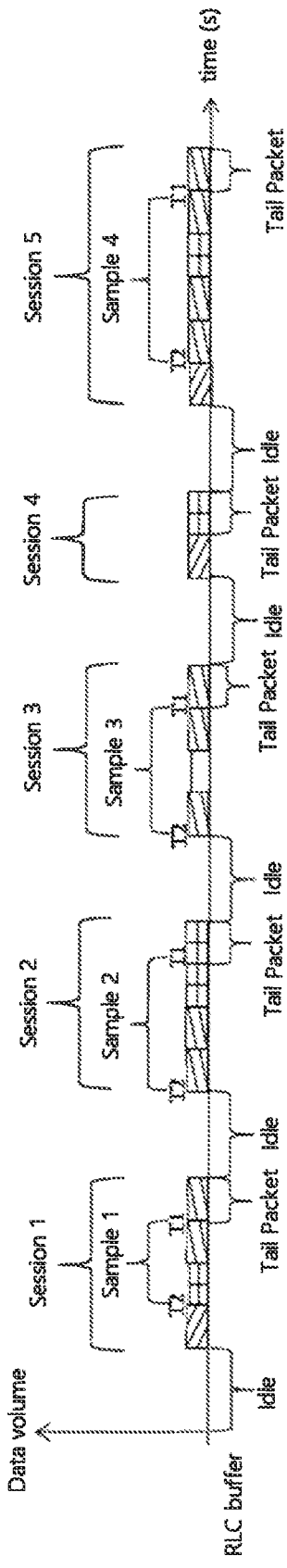
FIG. 2 is a statistical flowchart for Scheduled IP Throughput according to existing technologies.

In this regard in 3GPP TS 36.314 and 36.450 a clear definition is provided for Scheduled IP Throughput, of which a specific schematic diagram is shown in FIG. 1. FIG. 1 is a schematic diagram of a Scheduled IP Throughput statistical method according to existing technologies. FIG. 2 is a statistical flowchart for Scheduled IP Throughput according to existing technologies. The statistical method is shown in FIG. 2.

T2 denotes a time point at which a first piece of data or shard, which is received after a buffer is empty, starts to be transmitted via an air interface, as shown in FIG. 2, in which a first packet scheduling waiting time is not included. It should be noted that, the buffer being empty denotes an idle status in FIG. 2, the first piece of data or shard received after the buffer is empty is considered as a first packet, and the first packet scheduling waiting time denotes a first packet scheduling waiting delay as shown in FIG. 2, during which a scheduler might not receive a scheduling resource requested by a user, and an RLC buffers data but is not scheduled.

T1 denotes a time point at which a next-to-last piece of data from T2 in the case that the buffer is empty is successfully sent, as shown in FIG. 2.

Session denotes a continuous data transmission process, e.g., Session 1, Session 2, Session 3, Session 4, and Session 5, as shown in FIG. 2.

Sample denotes a continuous data transmission processes in the session, in which the buffer is not empty and scheduling occurs at least two times, e.g., Sample 1, Sample 2, Sample 3, and Sample 4, as shown in FIG. 2.

The scheduled IP throughput is calculated as follows:
1) ThpTime (data transmission time) denotes a sum of a time (T1–T2) of all samples in all sessions within a certain statistical time period, e.g., the sum of the time differences (T1–T2) of all samples in all sessions shown in FIG. 2.
2) ThpVol (data volume) denotes a data volume of a Packet Data Convergence Protocol (PDCP) Serving Data Unit (SDU) that is successfully sent over an air interface, except for a last piece of sharded data in the case that the buffer is not empty.
3) Tail packet denotes the last piece of sharded data in the case that the buffer is not empty, as shown in FIG. 2.

4) Scheduled IP Throughput is calculated in each Quality of Service (QoS) level for each user.

A Scheduled IP Throughput equation (see the below) is introduced to calculate the Scheduled IP Throughput, in which a quotient is calculated after the data volumes and times of all samples are summed, respectively.

$$\text{Scheduled } IP \text{ Throughput} = \frac{\sum_{Samples} ThpVol}{\sum_{Samples} ThpTime}$$

As mentioned above, the Scheduled IP Throughput mainly depends on a status change of the buffer (empty or not) to determine a tail packet, to achieve the purpose of removing the tail packet.

However, in practical application scenarios, this statistical method in the protocol can reflect the radio air interface performance in a centralized packet-incoming (high-traffic service) scenario, but has some certain limitations in a discrete packet-incoming (intermittent service) scenario. However, some common models to a wireless network user, such as web page, video, and voice, are all discrete packet-incoming service models, resulting in a large deviation between the calculated Scheduled IP Throughput index and the actual radio air interface performance. In the centralized packet-incoming scenario, incoming packets for an upper-layer service can guarantee that the size of data in the buffer is always greater than the radio air interface capability, and all scheduling resources can be sufficiently utilized in each scheduling, such that the indexes obtained by statistical calculation can truly reflect the radio air interface performance, as shown by Sample 3 in FIG. 2. In the discrete packet-incoming scenario, incoming packets for an upper-layer service are relatively discrete and thus the size of the data in the buffer cannot always be greater than the radio air interface capability. The packets arrive at the buffer continuously while a scheduler is allocating scheduling resources, and thus the buffer has never been empty. However, the scheduler does not allocate all scheduling resources during each scheduling. According to the statistical methods of existing technologies, the data volume and time of these schedulings will be included in the statistics for the Scheduled IP Throughput index, resulting in that the statistically calculated index cannot truly reflect the wireless air interface performance, e.g., in Samples 1, 2, and 4 the size of the scheduling resource allocated by the scheduler is greater than or equal to the size of the scheduling resource requested by the user, as shown in FIG. 2.

Figure 3:
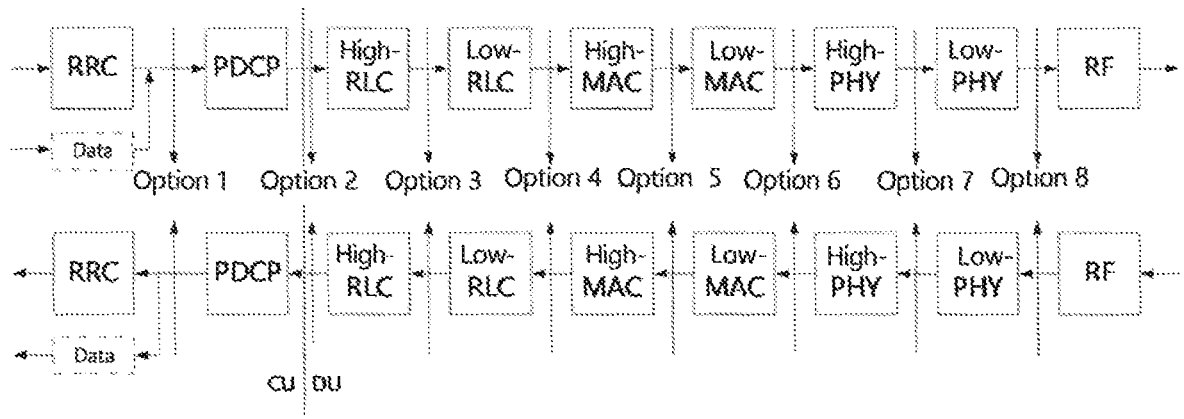
FIG. 3 is a schematic diagram of various NR networking options according to existing technologies.

In addition, this statistical method also has problems in 5G NR (New Radio). FIG. 3 is a schematic diagram of various NR networking options according to existing technologies. As shown in FIG. 3, similar to 4G, a 5G NR base station adopting an architecture in which a Centralized Unit (CU) and a Distributed Unit (DU) are separated also requires a similar radio air interface performance measurement method. On the premise of truly reflecting the radio air interface performance, the statistical method is required to be applicable to various combinations of CU/DU functional segments, such as option 1-option 8 in FIG. 3, and to be compatible with LTE networking. Such a measurement method may be referred to as Scheduled Throughput or User Throughput, and has the same statistic purpose as the 4G Scheduled IP Throughput index.

In various combinations of CU/DU functional segments, when PDCP and RLC are on the same CU or DU unit, a method similar to that specified in 4G protocols can be adopted continuedly. Of course, the method may inherit the problem mentioned above: the small packets in the discrete packet-incoming scenario are overstated in the Scheduled IP Throughput statistics in the 36.314 protocol.

In view of the above, following embodiments are provided.

Embodiment 1

Figure 4:
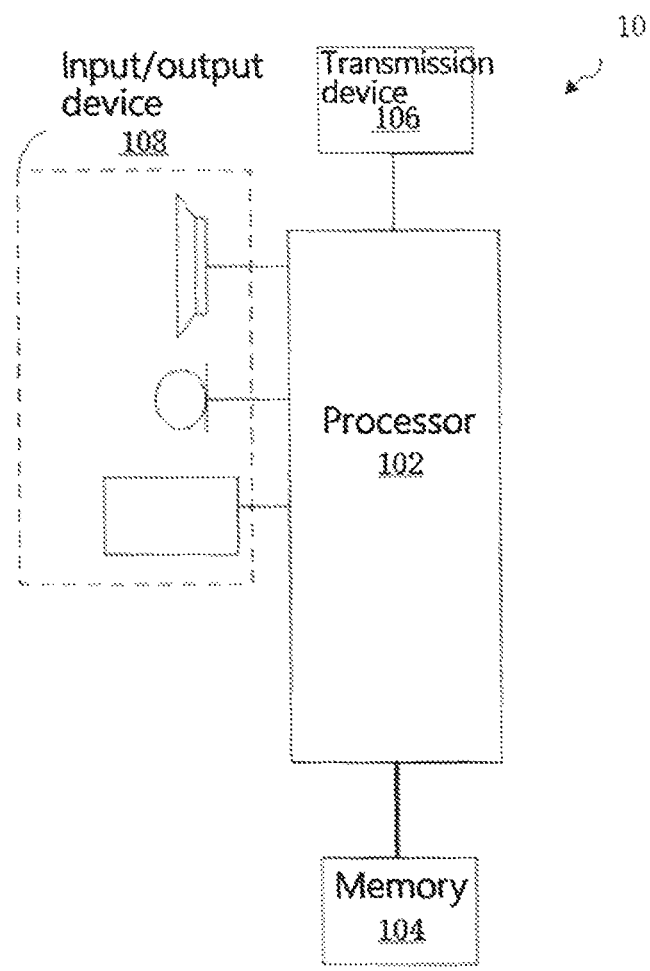
FIG. 4 is a block diagram showing a hardware structure of a mobile terminal for acquiring a scheduled throughput according to an embodiment of the present disclosure.

A method according to an embodiment may be executed in a mobile terminal, a computer terminal, or a similar computing device. Taking the method being performed on the mobile terminal as an example, FIG. 4 is a block diagram showing a hardware structure of the mobile terminal on which the method for acquiring a scheduled throughput is performed according to the embodiment of the present disclosure. As shown in FIG. 4, the mobile terminal 10 may include one or more (only one is shown in FIG. 4) processors 102 (the processor 102 may include, but is not limited to, a processing device such as a microprocessor MCU or a programmable logic device FPGA), and a memory 104 configured to store data. In some embodiments, the mobile terminal may further include a transmission device 106 and an input/output device 108 for communication functions. Those having ordinary skill in the art may understand that the structure shown in FIG. 4 is only for illustration, and not intended to limit the structure of the mobile terminal. For example, the mobile terminal 10 may also include more or fewer components than those shown in FIG. 4, or have a different configuration from that shown in FIG. 4.

The memory 104 may be configured to store computer programs, for example, software programs and modules of application software, such as computer programs corresponding to the method for acquiring the scheduled throughput in the embodiment of the present disclosure. The processor 102 performs various functional applications and data processing tasks, i.e., implements the above method, by execute the computer programs stored in the memory 104. The memory 104 may include a high-speed random-access memory, and may also include a non-volatile memory, such as one or more magnetic storage devices, a flash memory, or other non-volatile solid-status memory. In some examples, the memory 104 may further include memories remotely provided with respect to the processor 102. These remote memories may be connected to the mobile terminal 10 via a network. The examples of said network include but are not limited to Internet, Intranet, local area network, mobile radio communications and a combination thereof.

The transmission device 106 is configured to receive or send data via a network. The specific examples of the network may include a wireless network provided by a communication provider of the mobile terminal 10. In an embodiment, the transmission device 106 includes a network interface controller (NIC), which may be connected to other network devices through a base station to communicate with the Internet. In another embodiment, the transmission device 106 may be a radio frequency (RF) module, which is configured to communicate with the Internet in a wireless manner.

Figure 5:
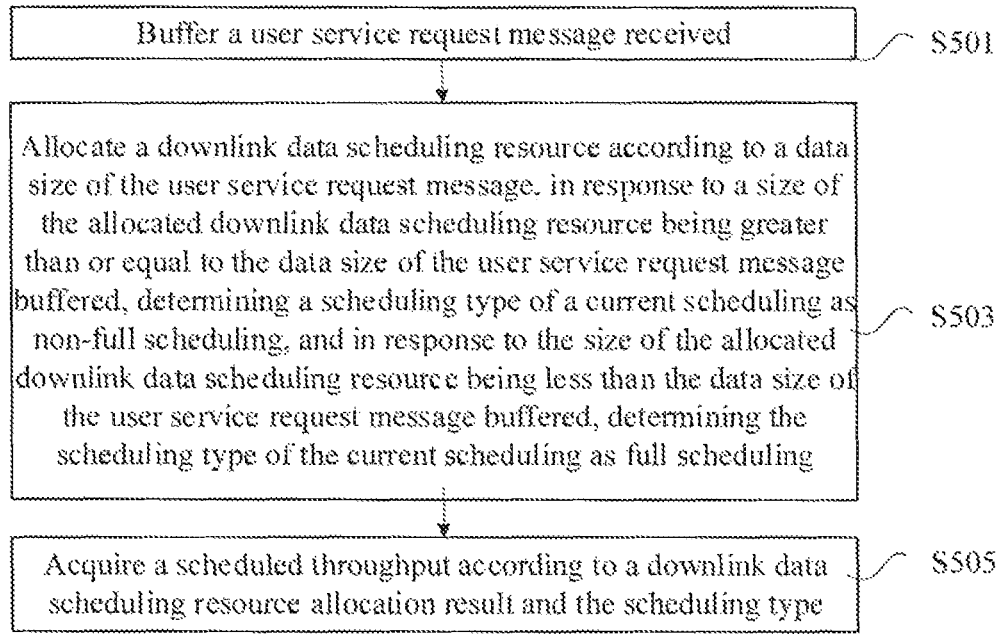
FIG. 5 is a flowchart of a method for acquiring a scheduled throughput according to an embodiment of the present disclosure.

According to the embodiment of the present disclosure the method for acquiring a scheduled throughput is provided. FIG. 5 is a flowchart of the method for acquiring the scheduled throughput according to the embodiment of the present disclosure. As shown in FIG. 5, the method includes steps S501-S505.

At S501, a user service request message received is buffered.

At S503, a downlink data scheduling resource is allocated according to a data size of the user service request message. In response to a size of the allocated scheduling resource being greater than or equal to the data size of the buffered user service request message, a scheduling type of a current scheduling is determined as non-full scheduling, and in response to the size of the allocated scheduling resource being less than the data size of the buffered user service request message, the scheduling type of the current scheduling is determined as full scheduling.

At S505, a scheduled throughput is acquired according to a downlink data scheduling resource allocation result and the scheduling type.

According to the method, the user service request message received is buffered, and the downlink data scheduling resource is allocated according to the data size of the user service request message, where in response to a size of the allocated scheduling resource being greater than or equal to the data size of the user service request message buffered, the scheduling type of the current scheduling is determined as non-full scheduling, and in response to the size of the allocated scheduling resource being less than the data size of the buffered user service request message, the scheduling type of the current scheduling is determined as full scheduling, and then the scheduled throughput is acquired according to the downlink data scheduling resource allocation result and the scheduling type. The method solves the problem that the scheduled throughput index is distorted due to excessive statistics of small packets in the discrete service scenario in existing technologies, effectively remove the tail packet, and improves the calculation precision of the scheduled throughput.

In some embodiments, S503 may further include: sending a Buffer Status Report (BSR), where the BSR carries the user service request message buffered; and allocating the downlink data scheduling resource according to the data size of the user service request message carried in the BSR.

In some embodiments, S505 may further include: performing statistics on data transmission time (ThpTime) of each sample in each session within a target time period, where the session is a continuous data transmission process, and the sample is a continuous data transmission process of at least one full scheduling in the session; performing statistics on a SDU data volume (ThpVol) of each sample in each session within the target time period; and acquiring the scheduled throughput by using the data transmission time and the SDU data volume.

In some embodiments, S505 may further include: labeling a time at which the statistics start as T2 in response to the statistics starting from the full scheduling; and in response to the non-full scheduling first appearing after the time T2, labeling a time at which the non-full scheduling starts as T1, such that the data transmission time of a single sample is T1−T2. The step of performing statistics on the SDU data volume of each sample in each session within the target time period includes: taking a length of an SDU message successfully transmitted within the data transmission time of the single sample as the SDU data volume.

In some embodiments, in the step of acquiring the scheduled throughput by using the data transmission time and the SDU data volume may further include: summing the SDU data volumes of all samples in all sessions to obtain a total data volume; summing the data transmission times of all samples in all sessions to obtain a total time; and dividing the total data volume by the total time to obtain the scheduled throughput, a equation can be:

$$\text{Scheduled Throughput} = \frac{\sum_{Samples} ThpVol}{\sum_{Samples} ThpTime}$$

Most 5G base stations usually adopt a segmenting mode in which PDCP and RLC are separated (see Option 2 shown in FIG. 3). Under this mode, the method for 4G protocols is no longer applicable for the statistics of the index, as the PDCP protocol processing is on the CU side, while the RLC and MAC protocol processing responsible for scheduling are on the DU side. In addition, at a F1 port between CU and DU, the GTP tunneling protocol-user plane (GTPU) channel protocol has no interaction field due to protocol isolation. If the statistics is performed on the CU side only, although the CU side can provide the statistics on the size of a IP protocol layer packet (PDCP SDU data), it cannot remove the tail packet in combination with the radio air interface scheduling resources on the DU side. Alternatively. if the statistics is performed on the DU side only, although the air interface rate that reflects the radio air interface scheduling capability can be calculated by removing the tail packet in combination with the radio air interface scheduling resources, the size of the IP protocol layer packet cannot be obtained from the CU, resulting in difficulties with calculating the IP layer rate.

At present, Ericsson has proposed a statistical method for the radio air interface performance in NR scenarios (3GPPTSG SA WG5 (Telecom Management) Meeting ##119AdHoc S5-184340 26-28 Jun. 2018, Stockholm (Sweden)) based on 3GPP36.314 and 36.450 protocols. That is, based on the 3GPP36.314 and 36.450 protocols, a user throughput on the DU side is calculated for a 5G NR scenario, attempting to reflect the radio air interface performance with a MAC layer rate. At present, this proposal can meet various networking scenarios of 5G NR CU/DU, and can also be applied to the statistics of the LTE radio air interface. However, the proposal still has following limitations: the problem of excessive statistics of small packets in the discrete packet-incoming scenario still occurs; the user throughput of the MAC layer contains redundant information such as padding, which is not an effective data rate, i.e., the user throughput rate calculated may be high, but the effective data rate may be very low as some of those statistical data is padding data, resulting in that the true wireless performance cannot be reflected.

The radio air interface performance is an important index in evaluating a wireless system, involving user perception, system load, congestion and other factors, and is thus regarded as a very important reference index for wireless network optimization and expansion. Therefore, there is an urgent need of improvement to the 3GPP protocol Scheduled IP Throughput and the Ericsson's 5G NR user Throughput.

In view of the above, S501 of the embodiment of the present disclosure may include: receiving, by an RLC protocol entity, the user service request message; and buffering, by the RLC protocol entity, the user service request message received.

It should be noted that, the steps of the method according to the embodiment of the present disclosure may all be implemented in the user protocol stack. Before S501, that is, before the RLC protocol entity receives and buffers the user service request message, the user service request message arrives at a wireless base station and is processed in the user remote desktop protocol stack, and sent to the RLC protocol entity after being processed by a GTPU protocol entity and a PDCP protocol entity.

Figure 6:
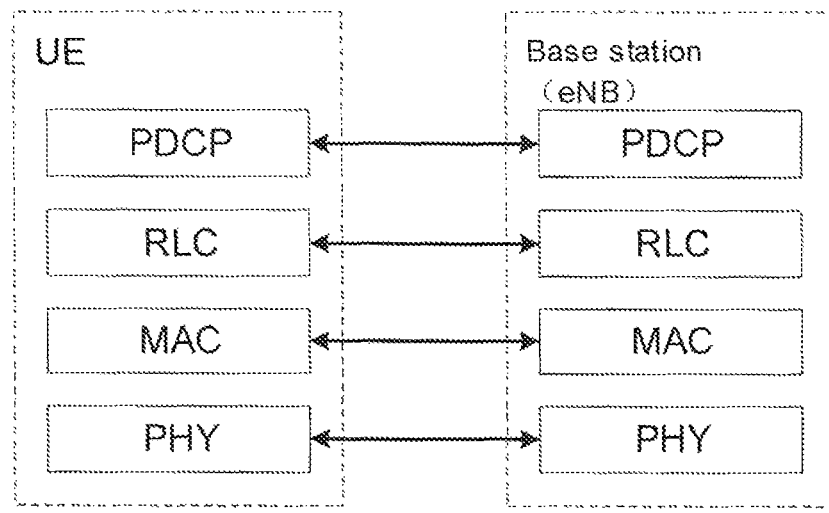
FIG. 6 is a schematic diagram showing an architecture of a user protocol stack according to an embodiment of the present disclosure.

FIG. 6 is a schematic diagram showing an architecture of the user protocol stack according to an embodiment of the present disclosure.

In some embodiments, S503 may include: sending, by the RLC protocol entity, a BSR to a scheduler, the BSR carrying the user service request message buffered; and allocating, by the scheduler, the downlink data scheduling resource according to a data size of the user service request message carried in the BSR.

In some embodiments, S505 may include: sending, by the scheduler, the downlink data scheduling resource allocation result and the scheduling type to a MAC protocol entity; performing statistics, by the MAC protocol entity, on following data: the data transmission time of each sample in each session within a target time period, and the SDU data volume of each sample in each session within the target time period; and acquiring, by the MAC protocol entity, the scheduled throughput by using the data transmission time and the SDU data volume.

According to the method for acquiring the scheduled throughput provided by the embodiment of the present disclosure, a method for determining full scheduling is designed according to the relationship between the scheduling resource allocated by the scheduler and the scheduling resource requested by each user. The data volume and time in scenarios where the radio air interface resources are not sufficiently utilized can be removed accurately based on each scheduling, the statistics is performed on the samples in full scheduling (the radio air interface resources are sufficiently utilized) status only. The radio air interface performance can be accurately measured, without relying on the size of the service packet. The statistics of the RLC SDU throughput are not only applicable in data statistics of the PDCP layer and the RLC layer of the LTE system, but also compatible with different 5G NR networking scenarios. In the calculation of the RLC protocol layer rate, as the RLC SDU has a fixed PDCP header length overhead with respect to the IP message length (an PDCP header length of each message is 2 bytes while PDCP SN is 12 bit, 1 byte while PDCP SN is 7 bit, or 3 bytes while PDCP SN is 18 bit), the data volume of PDCP SDU may be calculated according to the data volume of the RLC SDU. Therefore, the interference of padding in the MAC layer to rate statistics can be avoided, and the problem that the IP layer rate cannot be calculated on the DU side in the NR CU/DU separation scenario can also be solved.

Embodiment 2

According to an embodiment of the present disclosure a device for acquiring a scheduled throughput is provided. The device is configured to implement the above-mentioned embodiments, and those have been explained will not be repeated. As used below, the term "module" may be a combination of software and/or hardware with predetermined functions. Although the device described in following embodiment is implemented by software, hardware or a combination of software and hardware is also possible and conceived.

Figure 7:
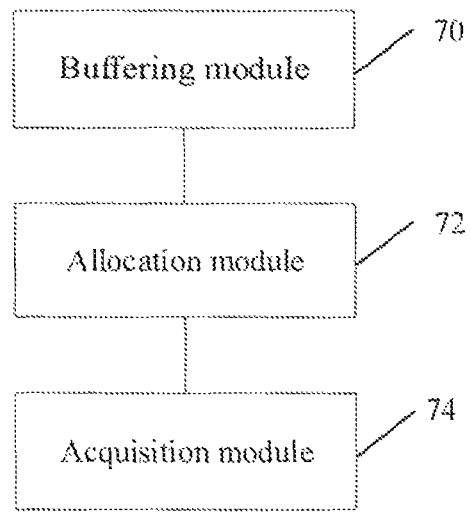
FIG. 7 is a structural block diagram of a device for acquiring a scheduled throughput according to an embodiment of the present disclosure.

FIG. 7 is a structural block diagram of a device for acquiring a scheduled throughput according to an embodiment of the present disclosure. As shown in FIG. 7, the device includes:

a buffering module 70, configured to buffer a user service request message received;

an allocation module 72, configured to allocate a downlink data scheduling resource according to a data size of the user service request message, where in response to a size of the allocated scheduling resource being greater than or equal to a data size of the buffered user service request message, a scheduling type of the current scheduling is determined as non-full scheduling, and in response to the size of the allocated scheduling resource being less than the data size of the buffered user service request message, the scheduling type of the current scheduling is determined as full scheduling; and an acquisition module 74, configured to acquire a scheduled throughput according to a downlink data scheduling resource allocation result and the scheduling type.

In some embodiments, the allocation module 72 includes a sending unit, configured to send a BSR, the BSR carrying the user service request message buffered; and a first allocation unit, configured to allocate the downlink data scheduling resource according to the data size of the user service request message carried in the BSR.

In some embodiments, the acquisition module 74 includes a first statistics unit, configured to perform statistics on data transmission time of each sample in each session within a target time period, where the session is a continuous data transmission process, and the sample is continuous data transmission process of at least one full scheduling in the session; and a second statistics unit, configured to perform statistics on a SDU data volume of each sample in each session within the target time period; and a first acquisition unit, configured to acquire the scheduled throughput by using the data transmission time and the SDU data volume.

In some embodiments, the first statistics unit is further configured to label a time at which the statistics start as T2 in response to the statistics starting from the full scheduling; and in response to the non-full scheduling first appearing after the time T2, label a time at which the non-full scheduling starts as T1, such that the data transmission time of the single sample is T1−T2. The second statistics unit is further configured to take a length of an SDU message successfully transmitted within the data transmission time of a single sample as the SDU data volume.

In some embodiments, the acquisition module 74 further includes a first summing unit, configured to sum the SDU data volumes of all samples in all sessions to obtain a total data volume; a second summing unit, configured to sum the data transmission times of all samples in all sessions to obtain a total time; and a calculation unit, configured to divide the total data volume by the total time to obtain the scheduled throughput.

According to the embodiment of the present disclosure a base station is further provided. The base station is configured to carry the device for acquiring the scheduled throughput and implement the above-mentioned embodiments of the method for acquiring the scheduled throughput, and those have been explained will not be repeated.

Figure 8:
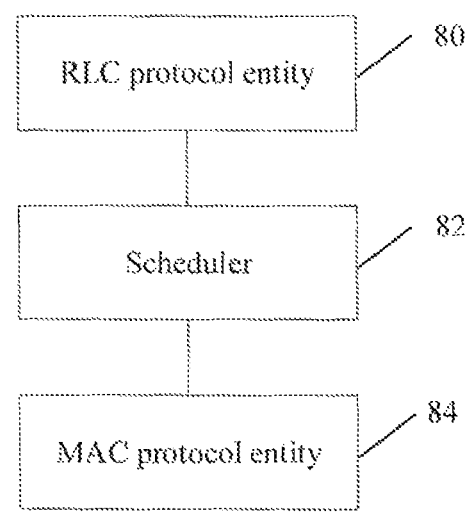
FIG. 8 is a structural block diagram of a base station according to an embodiment of the present disclosure.

FIG. 8 is a structural block diagram of a base station according to an embodiment of the present disclosure. As shown in FIG. 8, the base station includes:

an RLC protocol entity 80, configured to buffer a user service request message received;

an allocation module 82, configured to allocate a downlink data scheduling resource according to a data size of the user service request message buffered, where in response to a size of the allocated scheduling resource being greater than or equal to a data size of the buffered user service request message, a scheduling type of the current scheduling is determined as non-full scheduling, and in response to the size of the allocated scheduling resource being less than the data size of the buffered user service request message, the scheduling type of the current scheduling is determined as full scheduling; and a MAC protocol entity 84, configured to acquire a scheduled throughput according to a downlink data scheduling resource allocation result and the scheduling type.

In some embodiments, the RLC protocol entity 80 is further configured to receive the user service request message; and buffer the user service request message received.

In some embodiments, the RLC protocol entity 80 is further configured to send a BSR to a scheduler, the BSR carrying the user service request message buffered. The scheduler is further configured to allocate the downlink data scheduling resource according to the data size of the user service request message carried in the BSR.

In some embodiments, the scheduler 82 is further configured to send the downlink data scheduling resource allocation result and the scheduling type to a MAC protocol entity. The MAC protocol entity is further configured to perform statistics on following data: the data transmission time of each sample in each session within the target time period, and the SDU data volume of each sample in each session within the target time period. The MAC protocol entity is further configured to acquire the scheduled throughput by using the data transmission time and the SDU data volume.

In an embodiment of the present disclosure, a downlink service packet needs to undergo GTPU protocol processing, PDCP protocol processing, RLC protocol processing, MAC protocol processing, and physical layer PHY protocol processing before arriving at the base station from a core network via a GTPU channel, and is then sent to the user via a radio air interface.

Figure 9:
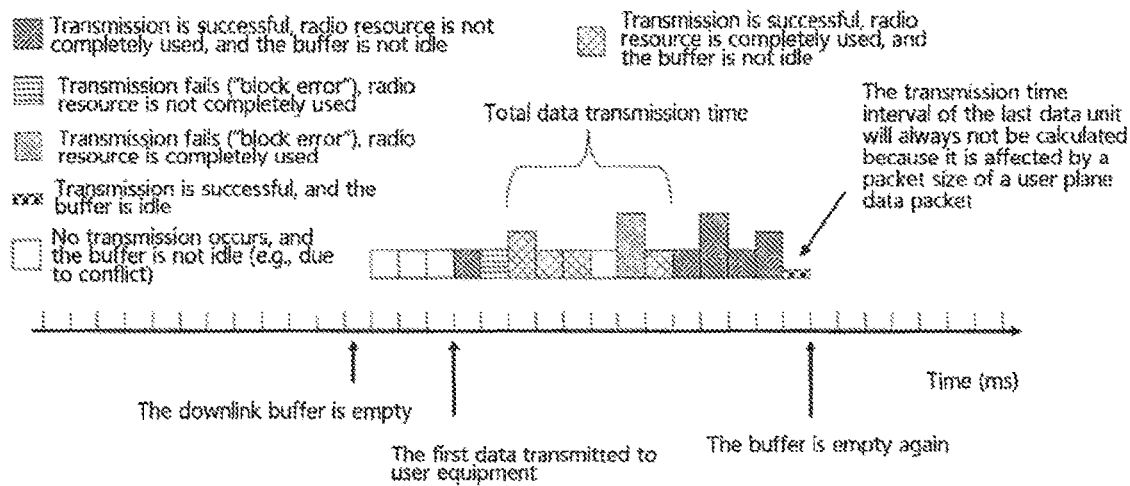
FIG. 9 is a schematic diagram of a statistical method for Scheduled IP Throughput according to an embodiment of the present disclosure.
Figure 10:
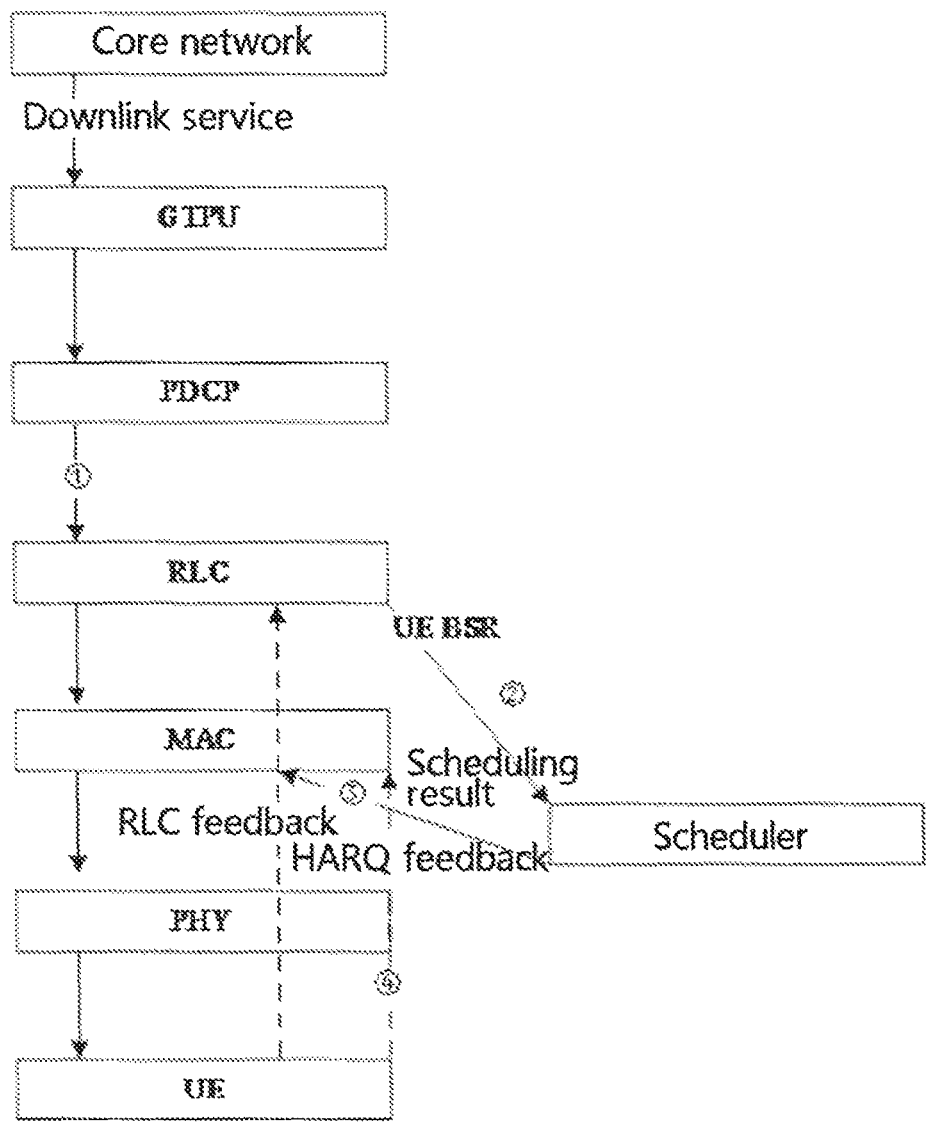
FIG. 10 is a flowchart for downlink service processing according to an embodiment of the present disclosure.

FIG. 9 is a schematic diagram of a statistical method for Scheduled IP Throughput according to an embodiment of the present disclosure. FIG. 10 is a flowchart of downlink service processing according to an embodiment of the present invention. Taking a sample in a downlink service session as an example, in conjunction with FIGS. 9 and 10, a method for removing a tail packet is as follows.

The user service request message arrives at the wireless base station, and is processed in a user remote desktop protocol stack, and sent to the RLC protocol entity after being processed by the GTPU protocol entity and the PDCP protocol entity (see ① in FIG. 10). The RLC protocol entity buffers the message in the buffer, and informs the scheduler in the form of BSR to perform message scheduling (see ② in FIG. 10) for requesting scheduling resources.

The scheduler receives the BSR, allocates the downlink data scheduling resource according to the size of the buffered data carried in the BSR, and determines whether the size of the allocated scheduling resource is greater than the size of the buffered data. The scheduling type of the current scheduling is labeled as non-full scheduling in response to a determination result of the size of the allocated scheduling resource being greater than the size of the buffered data; and the scheduling type of the current scheduling is labeled as full scheduling in response to a determination result of the size of the allocated scheduling resource being not greater than the size of the buffered data, as shown in FIG. 9. The scheduling result and the label are notified to the MAC protocol entity for corresponding processing (see ③ in FIG. 10).

While receiving and processing data, the MAC protocol entity performs the statistics based on the label. If the statistics begins with the full scheduling (non-full scheduling before), a time at which the statistics starts is labeled as T2 (Start), and a time at which the non-full scheduling first appears after the time T2 is labelled as T1 (End), such that the data transmission time (ThpTime) is calculated as T1−T2.

The length of an RLC SDU message successfully transmitted over the air interface during T1 and T2 is ThpVol (RLC SDU data volume).

A quotient is calculated after the ThpVol (RLC SDU data volume) and the ThpTime (data transmission time) of all samples in each session are summed respectively, to calculate the scheduled throughput.

Embodiment 3

Figure 11:
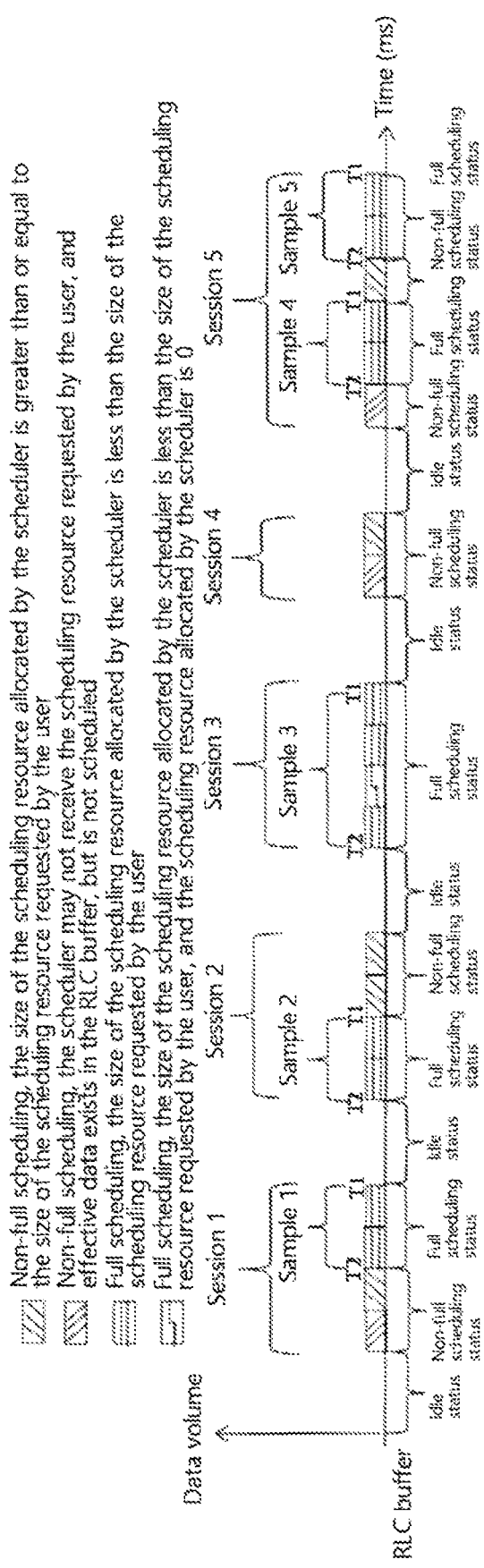
FIG. 11 is a statistical flowchart for a scheduled throughput according to an embodiment of the present disclosure.

FIG. 11 is a statistical flowchart for scheduled throughput according to an embodiment of the present disclosure. For a better understanding of the technical schemes of the above-mentioned embodiments, several embodiments are provided, and a specific description of the application scenario is made in conjunction with FIGS. 10 and 11.

Embodiment 3.1 (A Centralized Packet-Incoming Scenario, See Session 3 in FIG. 11)

Background

1) The scenario of the embodiment may be described as: the RLC buffer status changes in the order of: idle status (the buffer is empty)→full scheduling (each scheduling within this time period is full scheduling)→idle status (see Session 3 in FIG. 11), it is the centralized packet-incoming scenario.
2) The RLC protocol entity buffers no service packets.
3) The MAC layer records the RLC buffer status as an idle status.

The specific implementation steps are as follows.

At step 11, a user's request message is sent from a core network via a GTPU channel to a wireless base station, where the user's request message is processed in a user remote desktop protocol stack, i.e., processed by an GTPU protocol entity, an PDCP protocol entity, and an RLC protocol entity At step 12, the RLC protocol entity buffers the service message in the buffer, as indicated by ① in FIG. 10.

At step 13, the RLC protocol entity notifies a scheduler of the size of the current RLC buffer data in the form of BSR while determining that there is data in the RLC buffer, and requests a scheduling resource, as indicated by ② in FIG. 10.

At step 14, the scheduler receives the BSR sent by the RLC protocol entity and allocates the scheduling resource according to the BSR information. The scheduler assigns a full scheduling label to the current scheduling in response to the size of the allocated scheduling resource being less than the size of the buffered data, and sends the full scheduling label to the MAC protocol entity together with the scheduling result, and the method proceeds to step 15 (see ③ in FIG. 10). Alternatively, if the scheduling resource is insufficient, the scheduler does not allocate the scheduling resource, and step 14 is repeated.

At step 15, the MAC protocol entity receives the scheduling result and determines that the current scheduling is full scheduling according to the full scheduling label. The RLC SDU message of the scheduling is labeled as a full scheduling message. At this time, the MAC protocol entity records the current RLC buffer status, and updates its latest status to a full scheduling status. When determining that the RLC buffer status changes from the idle status or the non-full scheduling status to the full scheduling status, the MAC protocol entity updates T2 to the current time.

At step 16, the MAC protocol entity performs TB packeting according to the scheduling result (messages in the RLC buffer are assembled into TBs and deleted from the RLC buffer) and sends the TB packets via an air interface. At this time, if there is still data in the RLC buffer, the method goes back to step 14; if the RLC buffer is empty, T1 is updated to the current time, and the method proceeds to step 17.

At step 17, the MAC protocol entity records the ΔThpTime (the data transmission time of a single sample) of the current sample as T1−T2, which is then summed to ThpTime (the total time). The MAC layer updates the RLC buffer status to the idle status.

At step 18, the user receives data sent by the base station and sends an ACK (Acknowledgment) to the base station.

At step 19, the MAC protocol entity receives the HARQ ACK sent by the user, determines that the RLC SDU message in the acknowledged TB is the full scheduling message, and sums the length of the currently acknowledged RLC SDU message to ThpVol (the total data volume).

At step 110, the MAC protocol entity calculates a downlink Scheduled Throughput rate, i.e., the downlink Scheduled Throughput rate=ThpVol/ThpTime.

Embodiment 3.2 (A Discrete Packet-Incoming Scenario, See Session 1 in FIG. 11)

Background

The RLC buffer status changes in the order of: idle status (the buffer is empty)→non-full scheduling (each scheduling within this time period is non-full scheduling)→full scheduling (each scheduling within this time period is full scheduling)→idle status, see Session 1 in FIG. 11, which is the discrete packet-incoming scenario.

The RLC protocol entity buffers no service packets.

The MAC layer records the RLC buffer status as an idle status.

The specific implementation steps are as follows.

At step 21, the user's request message is sent from a core network to the wireless base station via the GTPU channel, where the user's request message is processed in the user remote desktop protocol stack, i.e., processed by an GTPU protocol entity, an PDCP protocol, and in turn an RLC protocol entity.

At step 22, the RLC protocol entity buffers the service message in the buffer, as indicated by ① in FIG. 10.

At step 23, the RLC protocol entity notifies the scheduler of the size of the current RLC buffer data in the form of BSR while determining that there is data in the RLC buffer, and requests the scheduling resource, as indicated by ② in FIG. 10.

At step 24: the scheduler receives the BSR sent by the RLC protocol entity, and allocates the scheduling resource according to the BSR information, where:
1) in response to the size of the allocated scheduling resource being less than or equal to the size of the buffered data, the scheduler assigns the non-full scheduling label to the current scheduling, and sends the non-full scheduling label to the MAC protocol entity together with the scheduling result, and the method proceeds to step 25, as indicated by ③ in FIG. 10;
2) in response to the size of the allocated scheduling resource being less than the size of the buffered data, the scheduler assigns the full scheduling label to the current scheduling, and sends the full scheduling label to the MAC protocol entity together with the scheduling result, and the method proceeds to step 25, as indicated by ③ in FIG. 10.

At step 25, the MAC protocol entity receives the scheduling result and determines the current scheduling type according to the label.
1) In the case that the current scheduling is not-full scheduling: the MAC protocol entity labels the RLC SDU message of the current scheduling as a non-full scheduling message; at this time, the MAC protocol entity records the current RLC buffer status, and updates its latest status to the non-full scheduling status; when determining that the RLC buffer status changes from the full scheduling status to the idle status or the non-full scheduling status, the MAC protocol entity updates T1 to the current time; the MAC protocol entity records the ΔThpTime (the data transmission time of a single sample) of the current sample as T1−T2, which is then summed to ThpTime (the total time), and the method proceeds to Step 26.
2) In the case that the current scheduling is full scheduling: the MAC protocol entity labels the RLC SDU message of this scheduling as a full scheduling message; at this time, the MAC protocol entity records the current RLC buffer status, and updates its latest status to the full scheduling status; when determining that the RLC buffer status changes from the idle status or a non-full scheduling status to the full scheduling status, the MAC protocol entity updates T2 to the current time; and the method proceeds to Step 26.

At step 26, the MAC protocol entity performs TB packeting according to the scheduling result (messages in the RLC buffer are assembled onto TBs and deleted from the RLC buffer) and sends the TB packets via the air interface, where:
1) there is still data in the RLC buffer, the method goes back to Step 24;
2) if the RLC buffer is empty, the MAC protocol entity records the current RLC buffer status, and updates the RLC buffer status to the idle status; when determining that the RLC buffer status changes from the full scheduling status to the idle status, the method proceeds to step 27; and when determining that the RLC buffer status changes from the non-full scheduling status to the idle status, the method proceeds to step 28.

At step 27, the MAC protocol entity records the ΔThpTime (the data transmission time of a single sample) of the current sample as T1−T2, which is then summed to ThpTime (the total time).

At step 28, the User Equipment (UE) receives data sent by the base station and sends an ACK to the base station (see ④ in FIG. 10).

At step 29, the MAC protocol entity receives the HARQ ACK sent by the UE, determines that the RLC SDU message of the acknowledged TB is a full scheduling message, and sums a length of the currently acknowledged RLC SDU message to the ThpVol (the total data volume).

At step 210, the MAC protocol entity calculates the downlink Scheduled Throughput rate, where:

downlink Scheduled Throughput rate=ThpVol/ThpTime.

Embodiment 3.3 (A Discrete Packet-Incoming Scenario, See Session 2 in FIG. 11)

Background

1) The RLC buffer status changes in the order of: idle status (the buffer is empty)→full scheduling (each scheduling within this time period is full scheduling)→non-full scheduling (each scheduling within this time period is non-full scheduling)→idle status (see Session 2 in FIG. 11), it is the discrete packet-incoming scenario.
2) The RLC protocol entity buffers no service packets.
3) The RLC buffer status recorded in the MAC layer is the idle status.

The specific implementation steps are the same as those in Embodiment 3.2.

Embodiment 3.4 (A Discrete Packet-Incoming Scenario, See Session 5 in FIG. 11)

Background

1) The RLC buffer status changes in the order of: idle status (the buffer is empty)→full scheduling (each scheduling within this time period is full scheduling)→non-full scheduling (each scheduling within this time period is non-full scheduling)→full scheduling (each scheduling within this time period is full scheduling)→idle status (see Session 5 in FIG. 11), it is the discrete packet-incoming scenario.
2) The RLC protocol entity buffers no service packets.
3) The RLC buffer status recorded in the MAC layer is the idle status.

The specific implementation steps are the same as those in Embodiment 3.2.

Embodiment 3.5 (A Discrete Packet-Incoming Scenario, See Session 4 in FIG. 11)

Background

1) The RLC buffer status changes in the order of: idle status (the buffer is empty)→non-full scheduling (each scheduling within this time period is non-full scheduling)→idle status (see Session 4 in FIG. 11), it is the discrete packet-incoming scenario.
2) The RLC protocol entity buffers no service packets.
3) The RLC buffer status recorded in the MAC layer records is the idle status.

The specific implementation steps are as follows.

At step 51, the user's request message is sent from the core network to the wireless base station via the GTPU channel, where the user's request message is process in the user remote desktop protocol stack, i.e., processed by the GTPU protocol entity, the PDCP protocol entity, and in turn the RLC protocol entity.

At step 52, the RLC protocol entity buffers the service message in the buffer (see ① in FIG. 10).

At step 53, the RLC protocol entity notifies the scheduler of the size of the current RLC buffer data in the form of BSR while determining that there is data in the RLC buffer, and requests a scheduling resource (see ② in FIG. 10).

At step 54, the scheduler receives the BSR sent by the RLC protocol entity and allocates the scheduling resource according to the BSR information; the scheduler assigns the non-full scheduling label to the current scheduling in response to the allocated scheduling resource being greater than or equal to the size of the buffered data, and sends the non-full scheduling label to the MAC protocol entity together with the scheduling result; and the method proceeds to step 55 proceeds (see ③ in FIG. 10).

At step 55, the MAC protocol entity receives the scheduling result and determines that the current scheduling is non-full scheduling according to the non-full scheduling label; the MAC protocol entity labels the RLC SDU message of the current scheduling as the non-full scheduling message; at this time, the MAC protocol entity records the current RLC buffer status, and updates the latest status to the non-full scheduling status; when determining that the RLC buffer status changes from the full scheduling status to the idle status or the non-full scheduling status, the MAC protocol entity updates T1 to the current time; the MAC protocol entity records the ΔThpTime (the data transmission time of a single sample) of the current sample as T1−T2, which is then summed to ThpTime (the total time), and the method proceeds to Step 56.

At step 56, the MAC protocol entity performs TB packeting according to the scheduling result (messages in the RLC buffer are assembled onto TBs and deleted from the RLC buffer) and sends the TB packets via an air interface.

At this time, the RLC buffer is empty, the MAC protocol entity records the current RLC buffer status, and updates the RLC buffer status to the idle status. When it is determined that the RLC buffer status has changed from the non-full scheduling status to the idle status, the statistics of this session ends.

Embodiment 3.6 (5G NR Scenario)

Figure 12:
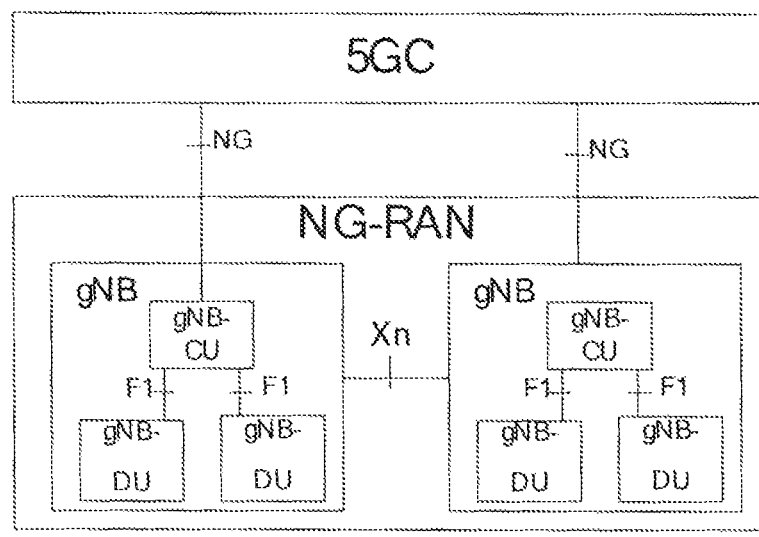
FIG. 12 is diagram showing an overall architecture of a NR according to an embodiment of the present disclosure.

FIG. 12 is an overall architecture diagram of NR according to an embodiment of the present disclosure. As shown in FIG. 12, since the CU and DU exchange messages through an F1 port and follow a GTPU standard protocol, the length of the PDCP SDU cannot be known on the DU side, so on the DU side only the RLC SDU length can be calculated.

The embodiment of present disclosure for the NR scenario is the same as Embodiments 3.1 to 3.5, and will not be repeated here.

Embodiment 4

According to an embodiment of the present disclosure further provided is a non-transitory computer-readable storage medium storing computer programs which, when executed, perform the steps of the method according to any of the above embodiments.

In this embodiment, the non-transitory computer-readable storage medium may store computer programs which, when executed, perform the following steps:

S1, buffering a user service request message received;

S2, allocating a downlink data scheduling resource according to a data size of the user service request message, where in response to a size of the allocated scheduling resource being greater than or equal to the data size of the user service request message buffered, a scheduling type of the current scheduling is determined as non-full scheduling, and in response to the size of the allocated scheduling resource being less than the data size of the buffered user service request message, the scheduling type of the current scheduling is determined as full scheduling; and S3, acquiring a scheduled throughput according to a downlink data scheduling resource allocation result and the scheduling type.

In some embodiments, the non-transitory computer-readable storage medium may be configured to store computer programs therein for performing steps of: sending a BSR, the BSR carrying the user service request message buffered; and allocating a downlink data scheduling resource according to the data size of the user service request message carried in the BSR.

In some embodiments, the non-transitory computer-readable storage medium may further store computer programs for performing steps of: performing statistics on data transmission time of each sample in each session within a target time period, where the session is a continuous data transmission process, and the sample is a continuous data transmission process of least one full scheduling in the session; performing statistics on a SDU data volume of each sample in each session within the target time period; and acquiring the scheduled throughput by using the data transmission time and the SDU data volume.

In some embodiments, the non-transitory computer-readable storage medium may include, but is not limited to: a U disk, a read-only memory (ROM), a random-access memory (RAM), a mobile hard disk drive, a diskette, a compact disc or various media that can store computer programs.

According to an embodiment of the present disclosure an electronic device is further provided. The electronic device may include a memory, a processor and computer programs stored in the memory and executable by the processor. The computer programs when executed by the processor, cause the processor to perform the steps in any of the above method embodiments.

In some embodiments, the electronic device may further include a transmission device and an input/output device. The transmission device and the input/output device are connected to the processor.

In some embodiments, the processor may be configured to execute the computer programs for performing steps of:

S1, buffering a user service request message received;

S2, allocating a downlink data scheduling resource according to a data size of the user service request message, where in response to a size of the allocated scheduling resource being greater than or equal to a data size of the buffered user service request message, a scheduling type of the current scheduling is determined as non-full scheduling, and in response to the size of the allocated scheduling resource being less than the data size of the user service request message buffered, the scheduling type of the current scheduling is determined as full scheduling; and S3, acquiring a scheduled throughput according to a downlink data scheduling resource allocation result and the scheduling type.

In some embodiments, the processor may further be configured to execute computer programs for performing steps of: sending a BSR, the BSR carrying the user service request message buffered; and allocating the downlink data scheduling resource according to the data size of the user service request message carried in the BSR.

In some embodiments, the processor may further be configured to execute computer programs for performing steps of: performing statistics on data transmission time of each sample in each session within a target time period, where the session is a continuous data transmission process, and the sample is a continuous data transmission process of least one full scheduling in the session; performing statistics on a SDU data volume of each sample in each session within the target time period; and acquiring the scheduled throughput by using the data transmission time and the SDU data volume.

For specific examples of the embodiment, reference may be made to those described in the above-mentioned embodiments and examples, and thus they are not repeated here.

It will be apparent to those having ordinary skill in the art that the modules or steps of the present disclosure described above may be implemented by a general-purpose computing device, which may be centralized on a single computing device, or distributed over a network of multiple computing devices. In some embodiments, the modules or steps of the present disclosure may be implemented by program codes executable by the computing device, which may be stored in a storage device and executed by the computing device. In some embodiments, the steps illustrated or described may be implemented in a sequence different from that herein, and the steps or modules may be separately fabricated into a plurality of integrated circuit modules, or some of them may be fabricated into a single integrated circuit module. Therefore, the present disclosure is not limited to any particular combination of hardware and software.

What is claimed is:

1. A method for acquiring a scheduled throughput, comprising:

buffering a user service request message received;

allocating a downlink data scheduling resource according to a data size of the user service request message, wherein a scheduling type of a current scheduling is determined as non-full scheduling in response to a size of the allocated downlink data scheduling resource allocated being greater than or equal to the data size of the user service request message buffered, and the scheduling type of the current scheduling is determined as full scheduling in response to the size of the downlink data scheduling resource allocated being less than the data size of the user service request message buffered; and acquiring a scheduled throughput according to a downlink data scheduling resource allocation result and the scheduling type.

2. The method of claim 1, wherein allocating the downlink data scheduling resource according to the data size of the user service request message comprises:

sending a buffer status report (BSR), the BSR carrying the user service request message buffered; and allocating the downlink data scheduling resource according to the data size of the user service request message carried in the BSR.

3. The method of claim 1, wherein acquiring the scheduled throughput according to the downlink data scheduling resource allocation result and the scheduling comprises:
   performing statistics on data transmission time of each sample in each session within a target time period, wherein the session is a continuous data transmission process, and the sample is a continuous data transmission process of at least one full scheduling in the session;
   performing statistics on a service data unit (SDU) data volume of each sample in each session within the target time period; and
   acquiring the scheduled throughput by using the data transmission time and the SDU data volume; and
   wherein the downlink data scheduling resource allocation result comprises at least one session, and each session comprises at least one sample.

4. The method of claim 3, wherein:
   performing statistics on the data transmission time of each sample in each session within the target time period comprises:
      labeling a time at which the statistics starts as T2 in response to the statistics starting from the full scheduling; and
      in response to the non-full scheduling first appearing after the time T2, labeling a time at which the non-full scheduling starts as T1, such that the data transmission time of a single sample is T1−T2; and
   performing statistics on the SDU data volume of each sample in each session within the target time period comprises:
      taking a length of an SDU message successfully transmitted within the data transmission time of the single sample as the SDU data volume.

5. The method of claim 4, wherein acquiring the scheduled throughput by using the data transmission time and the SDU data volume comprises:
   summing the SDU data volumes of all the samples in all the sessions to obtain a total data volume;
   summing the data transmission times of all the samples in all the sessions to obtain a total time; and
   dividing the total data volume by the total time to obtain the scheduled throughput.

6. The method of claim 3, wherein acquiring the scheduled throughput by using the data transmission time and the SDU data volume comprises:
   summing the SDU data volumes of all the samples in all the sessions to obtain a total data volume;
   summing the data transmission times of all the samples in all the sessions to obtain a total time; and
   dividing the total data volume by the total time to obtain the scheduled throughput.

7. The method of claim 1, wherein buffering the user service request message received comprises:
   receiving, by a radio link control (RLC) protocol entity, the user service request message; and
   buffering, by the RLC protocol entity, the user service request message received.

8. The method of claim 7, wherein allocating the downlink data scheduling resource according to the data size of the user service request message comprises:
   sending, by the RLC protocol entity, a BSR to a scheduler, the BSR carrying the user service request message buffered; and
   allocating, by the scheduler, the downlink data scheduling resource according to the data size of the user service request message carried in the BSR.

9. The method of claim 8, wherein acquiring the scheduled throughput according to the downlink data scheduling resource allocation result and the scheduling comprises:
   sending, by the scheduler, the downlink data scheduling resource allocation result and the scheduling type to a media access control (MAC) protocol entity;
   performing statistics, by the MAC protocol entity, on following data: the data transmission time of each sample in each session within the target time period, and the SDU data volume of each sample in each session within the target time period, wherein the downlink data scheduling resource allocation result comprising at least one session, and each session comprising at least one sample; and
   acquiring, by the MAC protocol entity, the scheduled throughput by using the data transmission time and the SDU data volume.

10. A device for acquiring a scheduled throughput, comprising:
    a buffering module, configured to buffer a user service request message received;
    an allocation module, configured to allocate a downlink data scheduling resource according to a data size of the user service request message, wherein a scheduling type of the current scheduling is determined as non-full scheduling in response to the size of the downlink data scheduling resource allocated being greater than or equal to the data size of the buffered user service request message, and the scheduling type of the current scheduling is determined as full scheduling in response to the size of the allocated downlink data scheduling resource being less than the data size of the buffered user service request message; and
    an acquisition module, configured to acquire a scheduled throughput according to a downlink data scheduling resource allocation result and the scheduling type.

11. The device of claim 10, wherein the allocation module comprises:
    a sending unit, configured to send BSR, the BSR carrying the user service request message buffered; and
    a first allocation unit, configured to allocate the downlink data scheduling resource according to the data size of the user service request message carried in the BSR.

12. The device of claim 10, wherein the acquisition module comprises:
    a first statistics unit, configured to perform statistics on data transmission time of each sample in each session within a target time period, wherein the session is a continuous data transmission process, and the sample is a continuous data transmission process of at least one full scheduling in the session;
    a second statistics unit, configured to perform statistics on an SDU data volume of each sample in each session within the target time period; and
    a first acquisition unit, configured to acquire the scheduled throughput by using the data transmission time and the SDU data volume; and
    wherein the downlink data scheduling resource allocation result comprises at least one session, and each session comprises at least one sample.

13. The device of claim 12, wherein,
the first statistics unit is further configured to:
- label a time at which the statistics starts as T2 in response to the statistics starting from the full scheduling; and
- in response to the non-full scheduling first appearing after the time T2, label a time at which the non-full scheduling starts as T1, such that the data transmission time of a single sample is T1−T2; and
- the second statistics unit is further configured to take a length of an SDU message successfully transmitted within the data transmission time of the single sample as the SDU data volume.

14. The device of claim 13, wherein the acquisition module further comprises:
- a first summing module, configured to sum the SDU data volumes of all the samples in all the sessions to obtain a total data volume;
- a second summing module, configured to sum the data transmission times of all the samples in all the sessions to obtain a total time; and
- a calculation unit, configured to divide the total data volume by the total time to obtain the scheduled throughput.

15. The device of claim 12, wherein the acquisition module further comprises:
- a first summing module, configured to sum the SDU data volumes of all the samples in all the sessions to obtain a total data volume;
- a second summing module, configured to sum the data transmission times of all the samples in all the sessions to obtain a total time; and
- a calculation unit, configured to divide the total data volume by the total time to obtain the scheduled throughput.

16. A base station, comprising:
- an RLC protocol entity, configured to buffer a user service request message received; and
- a scheduler, configured to allocate a downlink data scheduling resource according to a data size of the user service request message, wherein a scheduling type of a current scheduling is determined as non-full scheduling in response to a size of the allocated downlink data scheduling resource being greater than or equal to the data size of the user service request message buffered, and the scheduling type of the current scheduling is determined as full scheduling in response to the size of the allocated downlink data scheduling resource being less than the data size of the user service request message buffered; and
- a MAC protocol entity, configured to acquire a scheduled throughput according to a downlink data scheduling resource allocation result and the scheduling type.

17. The base station of claim 16, wherein the MAC protocol entity is configured to:
- receive a user service request message; and
- buffer the user service request message received.

18. The base station of claim 16, wherein
the RLC protocol entity is configured to send a BSR to the scheduler, the BSR carrying the user service request message buffered; and
the scheduler is configured to allocate the downlink data scheduling resource according to the data size of the user service request message carried in the BSR.

19. The base station of claim 18, wherein
the scheduler is further configured to send the downlink data scheduling resource allocation result and the scheduling type to the MAC protocol entity;
the MAC protocol entity is configured to perform statistics on following data: a data transmission time of each sample in each session within a target time period, and an SDU data volume of each sample in each session within the target time period, wherein the downlink data scheduling resource allocation result comprises at least one session, and each session comprises at least one sample; and
the MAC protocol entity is further configured to acquire the scheduled throughput by using the data transmission time and the SDU data volume.

20. A non-transitory computer-readable storage medium storing computer programs which, when executed, perform the method of claim 1.

21. An electronic device, comprising a memory, a processor, and computer programs stored in the memory and executable by the processor, wherein the computer programs, when executed by the processor, cause the processor to perform a method comprising:
- buffering a user service request message received;
- allocating a downlink data scheduling resource according to a data size of the user service request message, wherein a scheduling type of a current scheduling is determined as non-full scheduling in response to a size of the allocated downlink data scheduling resource allocated being greater than or equal to the data size of the user service request message buffered, and the scheduling type of the current scheduling is determined as full scheduling in response to the size of the downlink data scheduling resource allocated being less than the data size of the user service request message buffered; and
- acquiring a scheduled throughput according to a downlink data scheduling resource allocation result and the scheduling type.

* * * * *